Patented June 30, 1931

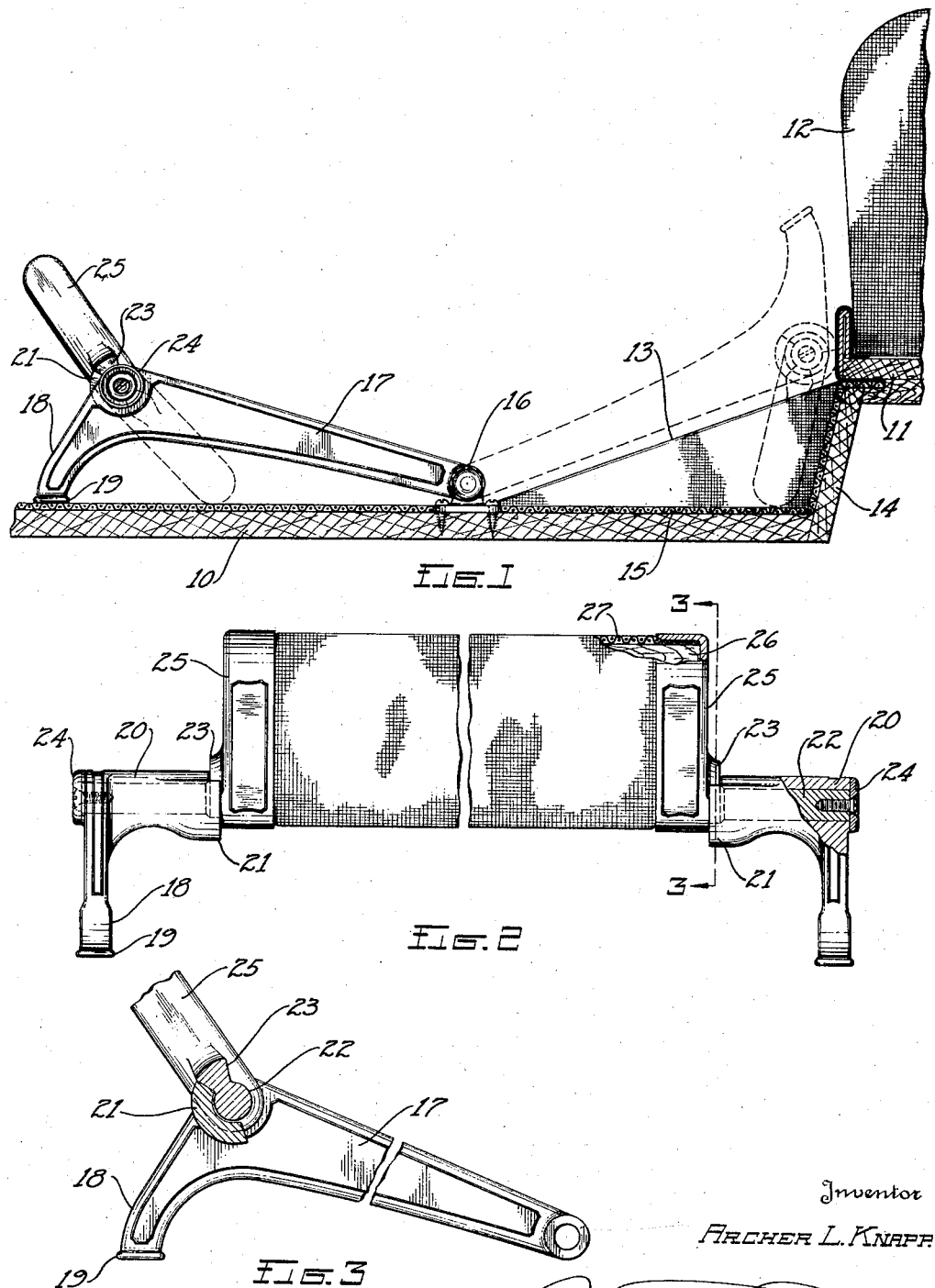

1,812,703

UNITED STATES PATENT OFFICE

ARCHER L. KNAPP, OF DETROIT, MICHIGAN, ASSIGNOR TO PACKARD MOTOR CAR COMPANY, OF DETROIT, MICHIGAN, A CORPORATION OF MICHIGAN

MOTOR VEHICLE

Application filed November 6, 1926. Serial No. 146,599.

This invention relates to motor vehicles and more particularly to foot rests for motor vehicles.

An object of the invention is to provide a foot rest for motor vehicles which may be easily and quickly adjusted to an operative position when needed and folded away when not in use.

Another object of the invention is to provide a foot rest for motor vehicles which is permanently secured to the floor and made adjustable to be readily placed into operative position or folded away when not needed against the heel board of the seat to provide an auxiliary heel board.

Another object of the invention is to provide a foot rest for motor vehicles which when not in use may be folded flush against the heel board of the seat with its broad side parallel thereto, so as to occupy but small space and leave available the maximum floor space of the vehicle for hauling baggage or merchandise.

A further object of the invention is to provide a foot rest for motor vehicles which may be adjusted for use in two positions according to the leg reach or fancy of the individual user and the desired position for the feet.

A still further object of this invention is to provide a foot rest for motor vehicles which is highly efficient in operation and yet of marked simplicity as a whole and in respect to its component parts so that its manufacture is economically facilitated.

Other objects of the invention will appear from the following description taken in connection with the drawings, which form a part of this specification, and in which:

Fig. 1 is a sectional view of a portion of a motor vehicle body illustrating the foot rest as installed, the same being shown in full lines in operative position and in dotted lines in a folded position.

Fig. 2 is a front elevation partly broken away, and

Fig. 3 is a sectional view taken on line 3—3 of Fig. 2 with part of the foot board and bracket broken away.

Referring by numerals to the drawings, 10 indicates the floor boards of a vehicle and 11 the rear seat upon which is the conventional cushion 12. The seat 11 is supported by a kick up sill 13 and a heel board 14. The floor boards, the kick up sill and the heel board are covered by a carpet 15. Mounted upon the floor in alinement with the kick up sill 13 on the opposite sides of the vehicle are corresponding brackets 16 which may be of any desired type.

Pivotally connected to the brackets 16 are a pair of arms 17. As shown the arms 17 have angular extensions 18 the extreme ends of which are enlarged as at 19 to provide suitable bearings or supports for the brackets when the foot rest is in position for use. The outer ends of the arms have oppositely disposed sleeves 20. These sleeves are formed at the juncture between the arms 17 and their lateral portions 18 and are provided upon their free ends with shouldered portions 21. As shown, the sleeves 20 are of sufficient length to so position their free ends as to clear the kick up sill 13, the object of which will hereinafter appear.

Mounted to rotate in each of the sleeves 20 are trunnions 22 each provided with a lug 23 adapted to engage the shouldered portion 21. The trunnions are secured within the sleeve in any preferred manner. As shown, they are retained within the sleeves 20 by disks 24 mounted upon screws threaded in the ends of the trunnions and lapped upon the ends of the sleeves. The trunnions 22 are formed integral with corresponding foot board support or socket members 25 in which are mounted the respective ends of a foot board 26 having a suitable covering 27.

When the foot rest is in an operative position or position for use, the foot rest proper or the foot board may be adjusted in either of two positions, according to the leg reach or fancy of the user. These two positions are clearly shown in Fig. 1 wherein the foot board is illustrated in an extended position in full lines and in a retracted position in dotted lines. In the former position the foot board is supported at an incline by the lug 23 abutting one end of the shoulder 21 and in the latter position the foot board is supported by the lug 23 abutting the opposite end of the shoulder 21 and by the engagement of the board with the floor of the vehicle. The foot board may be easily and quickly shifted into either of these positions and in shifting the same the sides thereof are reversed, thus prolonging the life of the covering on the board. When in the retracted position the board has, owing to the length of the sleeves, sufficient clearance from the arms to facilitate the handling thereof by its ends.

When the foot rest is not in use or in instances where it is desired to utilize the maximum floor space of the vehicle the arms 17 are folded back, in which position they are above and parallel to the kick up sill 13. When the arms are in this position the foot rest proper or foot board swings down between the kick up sills over the heel board 14 to function as an auxiliary heel board. In this folded away position the arms set back over the kick up sills and the sleeves thereupon so support the foot board that it will clear the kick up sills and will fit snugly between the sills and substantially flush against the heel board. In this position the foot board occupies the minimum floor space and provides an excellent auxiliary heel board in addition to its function as a reversible and adjustable foot board.

It will be understood that various forms of the invention other than those described above may be used without departing from the spirit or scope of the invention.

Having thus described the various features of my invention what I claim as new and desire to secure by Letters Patent is:

1. In a motor vehicle, the combination with the floor, the kick-up sills and the seat, of brackets secured to the floor in alinement with the kick-up sills, arms pivotally connected to the brackets, angular extensions on the ends of the arms providing supports, sleeves on the arms at the juncture between the arms and angular extensions, trunnions in the sleeves, cooperative stops between the sleeves and the trunnions, a foot board secured between the trunnions to operate as an adjustable foot rest when the arms are in an operative position and to swing down between the kick-up sills to provide a heel board for the seat when the arms are folded back over the kick-up sills.

2. In a motor vehicle, the combination with the floor and kick-up sills, of brackets secured on the floor, a pair of angular parallel members pivoted at one end to the brackets, the length of one face of said members being adapted to engage and be supported by said kick-up sills when moved rearwardly, and a foot-board pivotally carried by said angular members, and adapted to swing intermediate the kick-up sills to provide a heel-board in front of a seat of the vehicle.

3. In a motor vehicle, the combination with the floor and kick-up sills, of brackets secured to the floor, a pair of angular members secured at one end to the brackets, a pair of foot board supporting members pivoted at one end to the angular members, said members having sleeved extensions projecting interiorly beyond the kick-up sills, and a foot-board pivotally carried by said extensions in a position intermediate said kick-up sills.

In testimony whereof I affix my signature.

ARCHER L. KNAPP.